Sept. 28, 1965  Q. G. BOYD  3,208,763
CARRIAGE FOR INFANT'S SEAT
Filed May 19, 1964  2 Sheets-Sheet 1
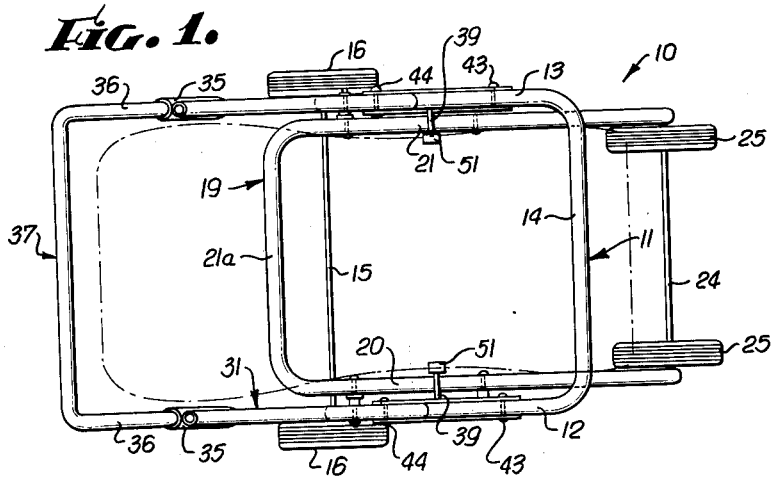
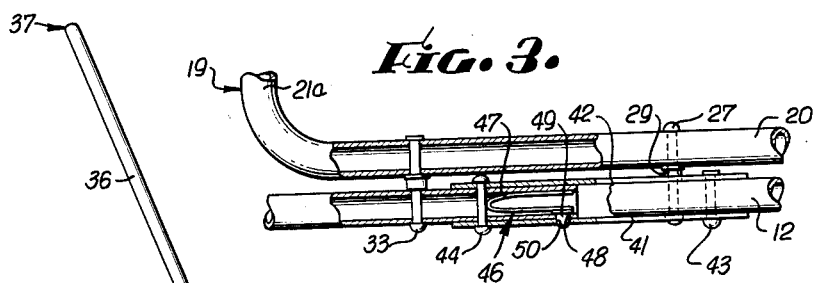
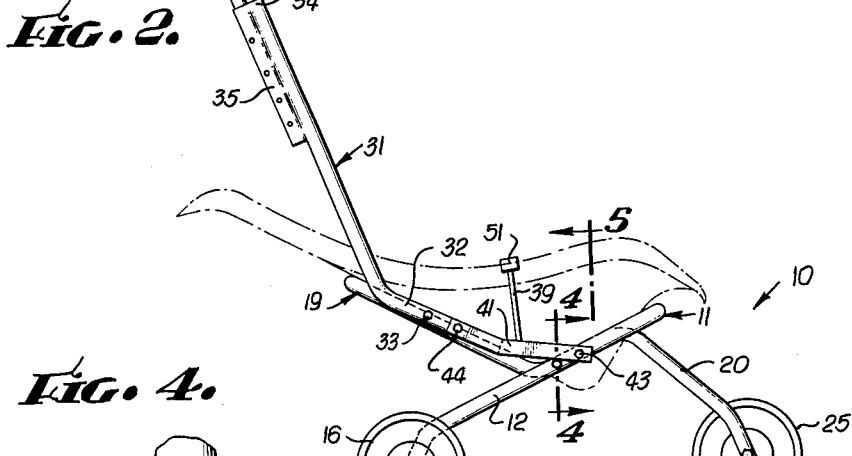
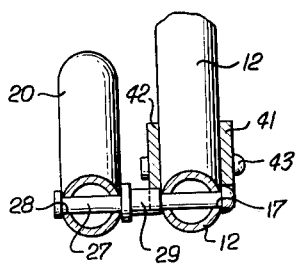
INVENTOR.
QUINN G. BOYD
BY Huebner & Worrel
ATTORNEYS.

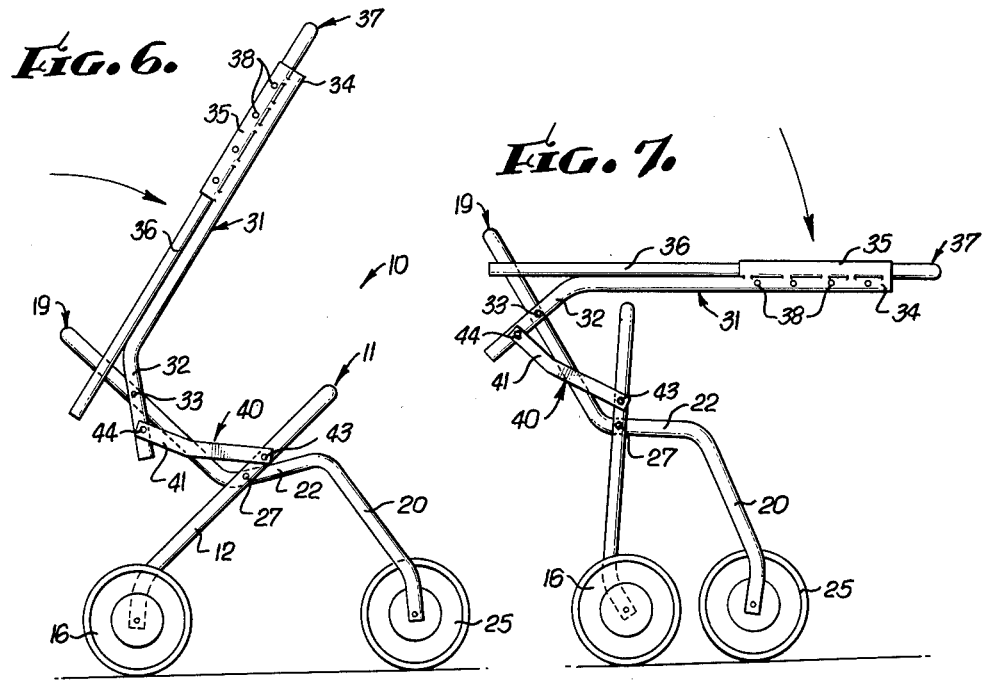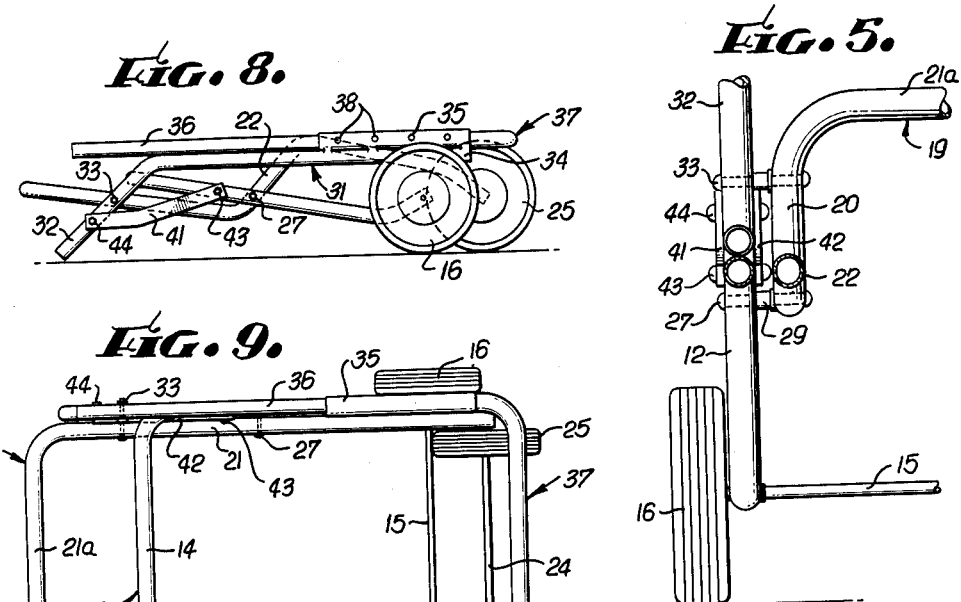

United States Patent Office 3,208,763
Patented Sept. 28, 1965

3,208,763
CARRIAGE FOR INFANT'S SEAT
Quinn G. Boyd, 4100 Krupp Drive, El Paso, Tex.
Filed May 19, 1964, Ser. No. 368,562
7 Claims. (Cl. 280—41)

This invention relates to a carriage for infant's seat and more particularly to a carriage whereby the infant's seat may be removably mounted therein and the carriage collapsed when the infant's seat is removed.

Infant's seats of various types and designs have been used to hold infants in stationary positions such as within a car or upon a chair or on the floor. In the present invention a carriage which utilizes an infant's seat is proposed which may be wheeled from place to place serving a similar purpose as a baby buggy or stroller but with the added advantage of allowing an infant's seat to be removed therefrom and used in a stationary position.

It is an object of this invention to provide a carriage for infant's seats which enjoys a construction whereby the seat may be inserted and removed from the carriage structure when desired.

It is another object of this invention to provide a carriage for infant's seat which can be collapsed when not in use and reduced to a relatively small compact assembly where the parts will lie in a general coextensive relationship.

A further object of this invention is to provide a carriage for infant's seat preferably constructed of tubular material and possessing a plurality of wheels whereby the assembly may be rolled or moved along.

Another object of this invention is to provide a carriage for infant's seat which employs a locking feature for retaining the carriage in an open position but which is releasable so that the carriage may be collapsed.

A further object of this invention is to provide an assembly which is relatively inexpensive to manufacture, easy to construct and of lightweight material.

These and other objects of the invention will be made more fully apparent from a consideration of the description which follows taken in conjunction with the drawings.

In the drawings:

FIGURE 1 is a top elevational view of the carriage in an open position including an infant's seat (shown in phantom lines) mounted therein;

FIGURE 2 is a side elevational view of the carriage in an open position including an infant's seat (shown in phantom lines) mounted therein;

FIGURE 3 is an exploded partial section of the carriage illustrating the locking mechanism;

FIGURE 4 is a view taken on line 4—4 of FIGURE 2;

FIGURE 5 is a view taken on line 5—5 of FIGURE 2;

FIGURES 6, 7 and 8 illustrate the carriage in three positions of collapse; and

FIGURE 9 is a top elevational view of the carriage in a collapsed position similar to that illustrated in FIGURE 8.

A collapsible carriage assembly generally designated 10 includes a plurality of preferably tubular members which are shaped and assembled to receive as by cradling an infant's seat of the generally commercially obtainable variety such as is illustrated in phantom lines in FIGURES 1 and 2 of the drawings. Most varieties of infant's seats include a back wall portion, a bottom wall portion usually normal to the plane of said back wall and parallel side walls to prevent lateral movement of the child placed therein.

The collapsible carriage 10 includes a first generally U-shaped frame member 11 preferably of tubular material having parallel side legs 12 and 13 extending rearwardly from the extremities of a crossbar 14. The legs 12 and 13 terminate in generally flattened ends through which an axle 15 extends and upon which are rotatably mounted a pair of normally rearwardly positioned wheels 16 when the carriage is open. Each of the respective side legs 12 and 13 intermediate the ends are provided with diametrically and aligned opposite openings 17 extending therethrough.

Pivotally secured to the first generally U-shaped frame member 11 is a second generally U-shaped member 19 preferably of tubular material including generally parallel side legs 20 and 21 extending forwardly from the extremities of a crossbar 21a. The side legs 20 and 21 are each provided with an offset central portion 22 intermediate the ends thereof. The legs 20 and 21 terminate in the generally flattened end through which an axle 24 extends and upon which are rotatably mounted a pair of normally forwardly positioned wheels 25 when the carriage is open, as best seen in FIGURE 2.

The first generally U-shaped frame member 19 is pivotally secured to the rearwardly extending U-shaped frame member 11 by means of pivot pin 27 which extends through the opening 17 in the first frame member 11 and opening 28 in the second frame member 19. The opening 28 is formed in the offset portion 22. The respective legs 12 and 13 are separated from the respective legs 20 and 21 by means of a bushing 29 of plastic or other suitable material through which the pivot pin 27 passes.

A pair of handle members designated 31 are provided each of which includes an offset or angled end portion 32. These members 31 are pivotally secured to the respective side legs 20 and 21 by a pivot pin 33 which extends through openings (unnumbered) in the respective arms. At the upper end 34 of each of the handle members a tubular collar 35 is secured thereto. These tubular collar members telescopingly receive legs 36 of a generally U-shaped handle 37. The legs 36 can be adjustably moved up and down and locked in position within the tubular collar members 35. The locking of the handle 37 may be accomplished by any desired means such as a spring loaded detent 38 on the legs extending into apertures in the collars 35.

The first generally U-shaped member 11 is linked to the handle members 31 and handle 37 by means of a mechanical linkage generally designated 40. The mechanical linkage 40 includes two pairs of angle plates 41 and 42, one pair being positioned on each side of the assembly. These respective pairs are pivotally mounted on each side of side leg 12 and the offset end portion 32 of handle members 31 by means of pivot pins 43 and 44 extending therethrough. The same type of linkage structure is also employed between the side leg 13 and offset end portion 32.

When the carriage is in an open position, such as is illustrated in FIGURE 2, an infant's seat of any of the well known varieties may be cradled within the assembled carriage whereby the back wall of the infant's seat rests against the crossbar 37 of the second generally U-shaped frame member 19 and the bottom wall of the infant's seat bears against the crossbar 14 of the first generally U-shaped frame member 11. Thus, as a child is placed in the infant's seat, the weight will bear the seat against the respective crossbars and set it in place.

In order to further secure the infant's seat within the carriage, any well known form of securing means such as a clip 51 may be employed. As illustrated, an elastic cord 39 is secured at one end to the legs and the other end to the clip 51 which fits over the edge of the infant's seat.

In order to lock the carriage 10 in an open position as shown in FIGURES 1 and 2, a releasable locking means 46 is provided on either one or both sides of the carriage. The preferred type of locking device includes a generally U-shaped spring 47, best seen in FIGURE 3, which is inserted within the tubular side leg 20 above the offset portion 22. The side leg 22 is provided with an opening 48 through which extends a detent 49 which is mounted on the spring 47. The outer angle plate 41 is provided with an aperture 50 into which the bottom 49 may lodge when the carriage is in the open position.

When its is desired to collapse the carriage, the detent 49 is depressed and the handle 36 is pulled forward in the direction of the arrow as shown in FIGURE 6. By disengaging the detent from the linking mechanism, the handle members 31 will be freely pivotable on the second generally U-shaped member 19 and through the linking mechanism 46 will pivot the first generally U-shaped member 11 on the second member 19 moving it rearwardly as is best shown in FIGURE 7. The continuing downward movement of the handle members 31 will move the wheels 16 to overlap the wheels 25 so that the first member 11 will repose in a relatively horizontal position as will the second member 19 and handle member 31, as best seen in FIGURE 8. With the center offset portion 22, it will be seen that in collapsed position, the wheels 16 and 25 will lie in a generally horizontal plane and the whole assembly will lie in a generally coextensive relationship.

While the preferred embodiment shows collar members 35 for receiving the handle 36, it should be noted that the handle members 31 could be of a sufficient diameter to directly receive the handle 37 telescoped therein.

Additionally, the preferred material for constructing the carriage is that of tubular steel or aluminum which possesses sufficient rigidity yet light enough for ease of lifting or transporting.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent devices.

I claim:

1. A collapsible carriage adapted to removably receive an infant's seat having a back wall, a bottom wall and side walls comprising when in open operating position a first generally U-shaped frame member including a forward crossbar, a pair of wheels rotatably mounted at the end of each leg of said first frame member, a second generally U-shaped frame member pivotally secured to said first frame member including a crossbar rearwardly of said forward crossbar whereby said crossbars are adapted to receive and support said infant's seat cradled therebetween, a pair of wheels rotatably mounted at the end of each leg of said second frame member, a handle means pivotally connected to said second generally U-shaped frame member, a linkage between said first frame member and said handle, a detent locking means associated with said linkage for retaining said handle means and said first and second frame members in said open operating position, and said linkage being freeable from said locking means whereby pivotal collapsing of said handle means will simultaneously cause said first frame member to pivot and said first frame member, said second frame member and said handle means will lie in a general coextensive collapsed relationship.

2. A collapsible carriage as defined in claim 1 wherein said handle means includes a pair of generally parallel tubular arms each pivotally connected to each leg respectively of said second generally U-shaped frame member, a generally U-shaped handle portion having its legs telescopingly mounted in said tubular arms, and locking means on said handle portion to retain said handle portion in a desired position.

3. A collapsible carriage as defined in claim 1 wherein said detent locking means associated with said linkage includes a spring loaded detent projecting from a leg of said second generally U-shaped frame member, and an aperture in said linkage to receive said detent.

4. A collapsible carriage as defined in claim 3 wherein a pair of detent locking means are employed on opposite legs of said second generally U-shaped frame member.

5. A collapsible carriage as defined in claim 1 wherein when in said open operating position the rear of said bottom wall and the rear of said back wall of said infant's seat will bear against said forward crossbar and said rearward crossbar respectively.

6. A collapsible carriage as defined in claim 1 wherein the central portions of each of said legs of said generally U-shaped second frame member form a offset to insure that when said carriage is collapsed said pair of wheels on said first frame member will overlap said pair of wheels on said second frame member and repose on a common axle plane therewith.

7. A collapsible carriage adapted to removably receive an infant's seat having a back wall, a bottom wall and side walls comprising when in open operating position a first generally U-shaped tubular frame member including a forward crossbar, a pair of wheels rotatably mounted at the end of each leg of said first tubular frame member, a second generally U-shaped tubular frame member wherein the central portions of each of said legs of said second tubular frame member form an offset portion, said second tubular frame member pivotally secured to said first tubular frame member at said offset portion and said second tubular frame member including a crossbar rearwardly of said forward crossbar whereby said crossbars are adapted to receive and support said infant's seat cradled therebetween, a pair of wheels rotatably mounted at the end of each leg of said second tubular frame member, a tubular handle means pivotally connected to said second tubular generally U-shaped frame member, at least one linkage plate between a leg of said first tubular frame member and said handle, a spring loaded detent projecting from the leg of said first tubular frame member and an aperture in said linkage plate to receive said detent adapted to retain said handle means and said first and second tubular frame members in said open operating position, and said linkage plate being freeable from said spring loaded detent whereby pivotal collapsing of said handle means will simultaneously cause said first tubular frame member to pivot and said first tubular frame member, said second tubular frame member and said tubular handle means will lie in a generally coextensive collapsed relationship.

References Cited by the Examiner

UNITED STATES PATENTS

| | | | |
|---|---|---|---|
| 1,764,914 | 6/30 | Van de Mark | 280—41 |
| 2,872,203 | 2/59 | Hedstrom | 280—41 |
| 2,913,249 | 11/59 | Welsh | 280—36 |

ARTHUR L. LA POINT, *Primary Examiner.*